United States Patent Office 2,850,503
Patented Sept. 2, 1958

2,850,503

PREPARATION OF METHYL AND ETHYL N-(5-NITRO-2-THIAZOLYL) CARBAMATES

Robert C. O'Neill, New York, N. Y., and Arthur J. Basso, Rahway, N. J., assignors to Merck & Co., Inc., Rahway, N. J., a corporation of New Jersey No Drawing. Application May 14, 1956
Serial No. 584,462

2 Claims. (Cl. 260—306.8)

This invention relates to an improved process for the preparation of alkyl N-(5-nitro-2-thiazolyl) carbamates and novel intermediates useful in said process.

The methyl and ethyl N-(5-nitro-2-thiazolyl) carbamates of the formula:

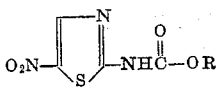

wherein R is a methyl or ethyl group, have been found to be valuable therapeutic agents which are useful in the treatment of enterohepatitis in turkeys.

It is an object of the present invention to provide improved processes for the preparation of alkyl N-(5-nitro-2-thiazolyl) carbamates. Another object is to provide novel intermediates useful in the synthesis of alkyl N-(5-nitro-2-thiazolyl) carbamates. Other objects will be apparent from the detailed description of the invention hereinafter provided.

The improved process of the present invention, a two-step process, comprises reacting 2-aminothiazole with an alkyl haloformate to produce the corresponding alkyl N-(2-thiazolyl) carbamate and then nitrating the latter compound to produce the desired alkyl N-(5-nitro-2-thiazolyl) carbamate. These reactions can be shown structurally as follows:

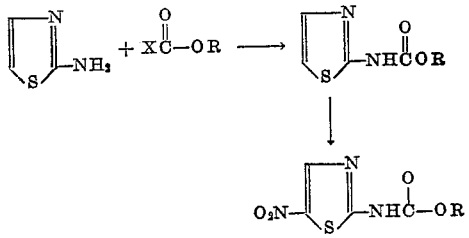

wherein R represents a methyl or ethyl group and X represents chlorine or bromine.

The first step of the foregoing process is carried out by intimately contacting 2-aminothiazole with the alkyl haloformate, preferably in the presence of a suitable inert solvent such as benzene, toluene, xylene, ethylene dichloride, dioxane, and the like. The formation of the desired alkyl carbamate derivative is rapid and exothermic. Thus, this first step of the process is conveniently effected by suspending the aminothiazole in the solvent, adding the alkyl haloformate and warming the reaction mixture on a steam bath. After completion of the reaction, the product which is precipitated can be conveniently separated from the solvent. If desired, the product so obtained can be further purified by crystallization from a suitable solvent such as ethanol.

Pursuant to a further embodiment of the present invention, it is found that the alkyl N-(2-thiazolyl) carbamate can be conveniently nitrated by reaction with nitric acid in the presence of sulfuric acid to form the 5-nitro derivative. Thus, the reaction is most conveniently effected by dissolving the alkyl N-(2-thiazolyl) carbamate in concentrated sulfuric acid, and adding concentrated nitric acid to the resulting cooled solution. In carrying out this step of the process, it is found that maximum yields of the desired nitro derivative are obtained under optimum conditions when the reaction is carried out at a temperature within the range of −10° to 10° C. After completion of the nitration, the nitrated product is conveniently recovered from the reaction mixture by adding water to the reaction mixture and recovering the precipitated product by filtration.

The ethyl and methyl N-(5-nitro-2-thiazolyl) carbamates can also be prepared by the reaction of 2-amino-5-nitrothiazole with alkyl haloformates. However, the process of the present invention possesses several advantages over the method using 2-amino-5-nitrothiazole. In the first place, the nitration of the alkyl N-(2-thiazolyl) carbamate results in a higher yield of pure nitrated product than can be obtained by the nitration of 2-aminothiazole. Further, the preparation of the carbamate of 2-aminothiazole proceeds under milder and more practical reaction conditions than does the preparation of the carbamates of 2-amino-5-nitrothiazole.

The following examples are presented as illustrative embodiments of this invention.

EXAMPLE 1

*Preparation of ethyl N-(2-thiazolyl) carbamate*

50 g. (0.5 mol) of crude 2-aminothiazole was suspended in 200 ml. benzene. To the stirred slurry was added 24 ml. (0.25 mol) of ethyl chloroformate. Heat was rapidly evolved, and a thick paste of the amine hydrochloride deposited on the walls of the flask. The reaction mixture was heated on the steam bath for one hour, and the clear supernatant was decanted. After evaporation of the benzene, the residual cream colored solid was washed well with water, filtered and dried. The ethyl N-(2-thiazolyl) carbamate prepared in this way melted at 155–6° C. to a clear liquid. The carbamate crystallizes from aqueous ethanol as colorless needles.

EXAMPLE 2

*Preparation of methyl N-(2-thiazolyl) carbamate*

Using the procedure described in Example 1, methyl N-(2-thiazolyl) carbamate, M. P. 172–173.5° C., was prepared. This carbamate recrystallizes from aqueous methanol or methanol as colorless matted needles.

The processes for the preparation of ethyl and methyl N-(2-thiazolyl) carbamate shown in the foregoing examples can also be carried out in the same manner using ethyl or methyl bromoformate in place of the chloroformate esters.

EXAMPLE 3

*Preparation of ethyl N-(5-nitro-2-thiazolyl) carbamate*

5.16 g. (0.03 mol) of ethyl N-(2-thiazolyl) carbamate, prepared as described above, was dissolved in 15.5 ml. concentrated sulfuric acid at 0° C. While this solution was vigorously stirred at −10° to 0° C., 2.07 ml. (0.033 mol) of concentrated nitric acid was added dropwise. After addition of the nitric acid, the clear yellow solution stood at −8° C. to 0° C. for two hours, then was poured on ice. The nearly colorless product which deposited was filtered and washed well with water. Additional material was obtained from the filtrate by adjusting the pH to 7 with sodium carbonate, and filtering the resulting precipitate. The ethyl N-(5-nitro-2-thiazolyl) carbamate melted at 196–7° C.

EXAMPLE 4

*Preparation of methyl N-(5-nitro-2-thiazolyl) carbamate*

The mixed acid nitration procedure described in Example 3 was employed to produce methyl N-(5-nitro-2-thiazolyl) carbamate. The product prepared by this method was of fine quality, melting with decomposition at 249–251° C.

The methyl or ethyl N-(5-nitro-2-thiazolyl) carbamates are very useful in treating turkeys infected with blackhead, and as prophylactics in preventing the infection of turkey flocks. These products are most conveniently administered orally by suspending or dispersing the carbamate compounds in the feed or drinking water of the turkeys. The concentration of the carbamates in the feed or drink will depend upon the severity of the infection, age of the turkeys, etc. In general, it is found that a concentration of the therapeutic agent of about 0.02% to about 0.2% in the feed or drink is satisfactory. Amounts of the therapeutic agents within this range show no toxic effects and do not disturb the normal growth and well being of the turkeys.

The alkyl N-(5-nitro-2-thiazolyl) carbamates of the present invention are especially useful in treating and preventing turkey blackhead infections since they form water soluble alkali metal salts and can therefore be conveniently administered to turkey flocks in the drinking water.

Various changes and modifications may be made in carrying out the present invention without departing from the spirit and scope thereof. Insofar as these changes and modifications are within the purview of the annexed claims, they are to be considered as part of our invention.

What is claimed is:

1. The process which comprises intimately contacting nitric acid with a solution of ethyl N-(2-thiazolyl) carbamate in concentrated sulfuric acid at a temperature within the range of about −10° C. to 10° C. to produce ethyl N-(5-nitro-2-thiazolyl) carbamate.

2. The process which comprises intimately contacting nitric acid with a solution of methyl N-(2-thiazolyl) carbamate in concentrated sulfuric acid at a temperature within the range of about −10° C. to 10° C. to produce methyl N-(5-nitro-2-thiazolyl) carbamate.

References Cited in the file of this patent

UNITED STATES PATENTS

| | | |
|---|---|---|
| 2,531,756 | Waletzy et al. | Nov. 28, 1950 |
| 2,573,657 | Steahly | Oct. 30, 1951 |

OTHER REFERENCES

Curry et al.: J. Am. Chem. Soc., vol. 73, pages 5043–6 (1951).